United States Patent [19]
Ikeda et al.

[11] Patent Number: 6,068,265
[45] Date of Patent: May 30, 2000

[54] GASKET FOR SEALING A REFRIGERANT COMPRESSOR

[75] Inventors: Hayato Ikeda; Noriyuki Shintoku; Keishi Nakagaki; Tomohiro Wakita, all of Kariya, Japan

[73] Assignee: Kabushiki Kaisha Toyoda Jidoshokki Seisakusho, Kariya, Japan

[21] Appl. No.: 08/988,078

[22] Filed: Dec. 10, 1997

[30] Foreign Application Priority Data

Dec. 12, 1996 [JP] Japan .................................. 8-331990

[51] Int. Cl.⁷ .................................................. F16J 15/10
[52] U.S. Cl. ........................................... 277/652; 277/594
[58] Field of Search .................................... 277/592, 594, 277/595, 627, 650, 652

[56] References Cited

U.S. PATENT DOCUMENTS

| | | | |
|---|---|---|---|
| 4,815,750 | 3/1989 | Yoshino | 277/595 |
| 4,861,047 | 8/1989 | Okano | 277/595 |
| 4,869,515 | 9/1989 | Uchida et al. | 277/595 |
| 5,170,927 | 12/1992 | Udagawa et al. | 277/595 |
| 5,316,322 | 5/1994 | Udagawa et al. | 277/595 |
| 5,516,124 | 5/1996 | Kubouchi et al. | 277/595 |
| 5,626,350 | 5/1997 | Kubouchi et al. | 277/595 |

FOREIGN PATENT DOCUMENTS 358149467   9/1983   Japan ...................................... 277/595

*Primary Examiner*—Anthony Knight
*Assistant Examiner*—Karlena D. Schwing
*Attorney, Agent, or Firm*—Burgess, Ryan & Wayne

[57] ABSTRACT

A metallic base gasket coated with elastic membrane having an outer sealing portion for sealing an outer circumference of a refrigerant compressor and an inner sealing portion for sealing boundaries between high and low pressure regions within the compressor, the outer and inner sealing portions being formed in an elastically deformable ridge, and at least one section of the ridge of the inner sealing portion being trifurcatedly connected to a portion of the ridge of the outer sealing portion to have a geometrical arrangement in which apex lines of the connected three ridges are equiangularly spaced apart from one another with respect to the center of the trifurcated connection of the ridges. The gasket may have an extended flat or curved face portion at the trifurcatedly connected ridges to permit the apexes of the connected ridges lie in the extended flat or curved face portion.

5 Claims, 4 Drawing Sheets

GASKET FOR SEALING A REFRIGERANT COMPRESSOR

BACKGROUND OF THE INVENTION

1. Field of the Invention

The present invention relates generally to a gasket for sealing a refrigerant compressor and, more particularly, relates to a metallic gasket covered with an elastic coating and adapted for providing a connecting portion between a cylinder block and end housings of a refrigerant compressor, and between high and low pressure regions inside the compressor, with a stable fluid-tight seal.

2. Description of the Related Art

In conventional refrigerant compressors such as swash plate and wobble plate type refrigerant compressors, a pair of front and rear cylinder blocks are axially combined together to define, at a connecting portion of both cylinder blocks, a swash plate chamber in which a refrigerant returning from an external refrigerating system is introduced to be compressed. The opposite ends of the combined front and rear cylinder blocks are closed by front and rear housings via front and rear valve plates and associated discharge valves. Each of the front and rear housings is provided with a radially outer suction chamber for the refrigerant gas before compression and a radially inner discharge chamber for the compressed refrigerant gas. The combined front and rear cylinder blocks are provided with a common central shaft bore for receiving therein an axial drive shaft on which a swash plate is fixedly mounted so as to be rotated with the drive shaft within the swash plate chamber. The combined front and rear cylinder blocks are provided with a plurality of axially extending cylinder bores in which double headed pistons operatively engaged with the swash plate via shoes are received to be reciprocated to implement suction and compression of the refrigerant gas, and to discharge the compressed refrigerant gas. Each of the front and rear valve plates is provided with suction ports bored therein and fluidly connected to the associated front or rear suction chamber. The suction ports of the front and rear valve plates are openably closed by suction valves. The front and rear valve plates are also provided with a plurality of discharge ports which are fluidly connected to the front and rear discharge chambers via the openable discharge valves and valve retainers which are formed as one part with gasket members interposed between the respective valve plates and the front and rear housings. The discharge ports of the front and rear valve plates are arranged to be in registration with the cylinder bores of the front and rear cylinder blocks to discharge the compressed refrigerant gas toward the front and rear discharge chambers through the discharge valves The front and rear suction chambers and the swash plate chamber are in fluid communication by suction passageways formed in the combined cylinder blocks. Similarly, the front and rear discharge chambers are fluid communication by discharge passageways formed in the combined cylinder blocks.

The outer framework of the refrigerant compressor provided by the above-mentioned combined front and rear cylinder blocks and the front and rear housings must be completely sealed against the atmospheric environment therearound. Further, since the compressor has, in the interior thereof, a low pressure region in which a suction pressure prevails, and a high pressure region in which a high pressure substantially corresponding to the compressed gas pressure prevails, the high and low pressure regions within the compressor must also be appropriately isolated from one an other. Thus, gaskets have been suitably incorporated in the compressor.

One of the typical gaskets assembled in a generally cylindrical body of a conventional refrigerant compressor is shown in FIGS. 6 and 7. Namely, a gasket 50 according to the prior art is made of a metallic plate coated with a thin elastic membrane. As best shown in FIG. 6, the gasket 50 includes an outer sealing portion 51 in the shape of a circular rim, and an inner sealing portion 52 in the shape of an annular rim arranged inside the outer sealing portion 51 and having curved portions extending toward and connected to the outer sealing portion 51. The outer sealing portion 51 functions to seal a circumferential region of the outer framework of the compressor against the atmosphere, and the inner sealing portion 52 functions to seal boundaries between the high pressure regions designated by "a" and the low pressure regions designated by "b", within the compressor body.

The gasket 50 further includes five radial ribs 53 between a central base rim 54 and the annular inner sealing portion 52 to function as valve retainers for determining an amount of opening of the discharge valves.

The gasket 50 has a ridge 61 arranged in the circular outer sealing portions 51 and a ridge 52 arranged in the annular inner sealing portion 52. These ridges 61 and 62 of the outer and inner sealing portions 51 and 52 of the gasket 50 are occasionally referred to as "beads", and are formed as smoothly curved projections having a continuously running apex, respectively (the apexes of the ridges 61 and 62 are shown by solid lines in FIG. 6, and these lines will be referred to as "an apex line", throughout the description hereinafter). The ridges 61 and 62 are trifurcatedly connected to one another at portions "A" and "B" where the outer sealing portion 51 and the inner sealing portion 52 are connected to each other. An enlarged view of the connecting portion "A" is shown in FIG. 7. The trifurcated connection of the ridges 61 and 62 of the outer and inner sealing portions 51 and 52 is achieved by a normal T-shape connection at the portion "A", and by an irregular T-shape connection at the portion "B". Nevertheless, the above-mentioned two trifurcated connections of the ridges 61 and 62 of the outer and inner sealing portions 51 and 52 have defects as set forth below. Namely, when the ridges 61 and 62 of the outer and inner sealing portions 51 and 52 of the gasket 50 are compressed between two mated parts such as an end of the front or rear cylinder block and the front or rear housing to be elastically deformed and collapsed, the mechanical rigidity of specified sections of the ridges 61 and 62, which are arranged adjacent to the connecting portions "A" and "B", is increased in comparison with the remaining sections of the ridges 61 and 62, and accordingly, the ridges 61 and 62 of the outer and inner sealing portions 51 and 52 of the gasket 50 cannot be elastically deformed uniformly which results in a failure to exhibit a stable sealing function at the connecting portions "A" and "B".

SUMMARY OF THE INVENTION

Therefore, an object of the present invention is to provide a metallic base gasket for refrigerant compressors which is improved so as to obviate the defects encountered by the conventional gasket for refrigerant compressors.

Another object of the present invention is to provide a metallic gasket, with a thin elastic membrane coating, adapted for use with refrigerant compressors which exhibits a stable and good sealing function in every section of the sealing portions thereof.

In accordance with one aspect of the present invention, there is provided a gasket having a surface thereof coated with an elastic membrane, adapted to being interposed, together with a valve plate and a discharge valve, between a cylinder block and a housing of a refrigerant compressor under compression, comprising:

an outer sealing portion for sealing an outer circumference of the compressor against an atmospheric environment therearound;

an inner sealing portion for sealing between a high pressure region and a low pressure region within the compressor, the inner sealing portion being provided with at least one predetermined section thereof trifurcatedly connected to the outer sealing portion; and a deformable ridge portion formed in each of the outer and inner sealing portions to have the shape of a curved projection with a continuously extending apex line, the ridge of the predetermined section of the inner sealing portion being interconnected with the ridge of the outer sealing portion to form a trifurcated connection in which three separate angles "θ" formed between three neighboring apex lines of the connected ridges are made substantially equal to one another.

Since the trifurcatedly interconnected deformable ridge portions of the inner and outer sealing portions of the gasket form three equal angles between the respective neighboring apex lines thereof, a balanced geometrical arrangement of the deformable ridge portions of the inner and outer sealing portions can be obtained so as to exhibit a substantially equal mechanical rigidity when the gasket is subjected to a compression between two mechanical parts, i.e., the cylinder block and the housing of the refrigerant compressor. As a result, the deformable ridge portions of the outer and inner sealing portions are elastically deformed so as to provide a stable and good sealing for not only the outer circumference of the compressor but also a boundary between the low and high pressure regions within the compressor.

In accordance with another aspect of the present invention, there is provided a gasket having a surface thereof coated with an elastic membrane, adapted to being interposed, together with a valve plate and a discharge valve, between a cylinder block and a housing of a refrigerant compressor under compression, comprising:

an outer sealing portion for sealing an outer circumference of the compressor against an atmospheric environment therearound;

an inner sealing portion for sealing between a high pressure region and a low pressure region within the compressor, the inner sealing portion being provided with at least one predetermined section thereof trifurcatedly connected to the outer sealing portion; and a deformable ridge portion formed in each of the outer and inner sealing portions to have the shape of a curved projection with a continuously extending apex line, the ridge portion of the predetermined section of the inner sealing portion being connected to the ridge portion of the outer sealing portion to form a trifurcated connection in which an extended and smooth face is provided to contain therein the apex lines of the connected ridge portions of the outer and inner sealing portions.

The extended and smooth face of the trifurcatedly connected ridge portions of the outer and inner sealing portions of the gasket can come into face-to-face contact with two separate parts of the compressor between which the gasket is held under compression. Therefore, the mechanical rigidities of the trifurcatedly connected respective ridge portions of the outer and inner sealing portions can be made substantially equal within the above-mentioned extended and smooth face. Thus, the sealing function of the gasket exhibited by the trifurcatedly connected ridge portions of the outer and inner sealing portions can be very stable and good. Further, the provision of the extended and smooth face at the trifurcated connection of the outer and inner sealing portions of the gasket can reduce abrasion of a die by which a metallic base of the gasket before being coated with the elastic membrane is produced by using a press machine. This is because the internal face of the die does not need to have a shaping portion to produce a trifurcated connection of apex lines of the ridge portions of the gasket. As the result, a productivity of the gaskets by the die can be appreciably increased.

In accordance with a further aspect of the present invention, there is provided a gasket having a surface thereof coated with an elastic membrane and adapted to being interposed, together with a valve plate and a discharge valve, between a cylinder block and a housing of a refrigerant compressor under compression, comprising:

an outer sealing portion for sealing an outer circumference of the compressor against an atmospheric environment therearound;

an inner sealing portion for sealing between a high pressure region and a low pressure region within the compressor, the inner sealing portion being provided with at least one predetermined section thereof trifurcatedly connected to the outer sealing portion; and a deformable ridge portion formed in each of the outer and inner sealing portions to have the shape of a curved projection with a continuously extending apex line, the ridge portion of the predetermined section of the inner sealing portion being connected to the ridge portion of the outer sealing portion to form a trifurcated connection in which three separate angles "θ" formed between three neighboring apex lines of the connected ridges are made substantially equal to one another, and an extended and smooth face is provided to contain therein the apex lines of the connected ridge portions of the outer and inner sealing portions.

The above-mentioned combination of the particular angular arrangement of the apex lines of the ridge portions and the extended and smooth face of the trifurcatedly connected ridge portions of the outer and inner sealing portions of the gasket can ensure that the sealing function exhibited by the gasket for the various sealed portions of the compressor can be very stable and of a very high quality. Further, the reduction in abrasion of the die for producing the gaskets can be promoted to increase the productivity of the gaskets by the die.

The above-mentioned extended and smooth face at the trifurcated connection of the ridges of the outer and inner sealing portions may be either a flat face or a smoothly curved face having a radius of curvature which is larger than that of the apex line of the ridges of the outer and inner sealing portions of the gasket.

BRIEF DESCRIPTION OF THE DRAWINGS

The above and other objects, feature and advantages of the present invention will be made more apparent from the following description of preferred embodiments thereof with reference to the accompanying drawings wherein.

DESCRIPTION OF THE PREFERRED EMBODIMENTS

Figure 1:
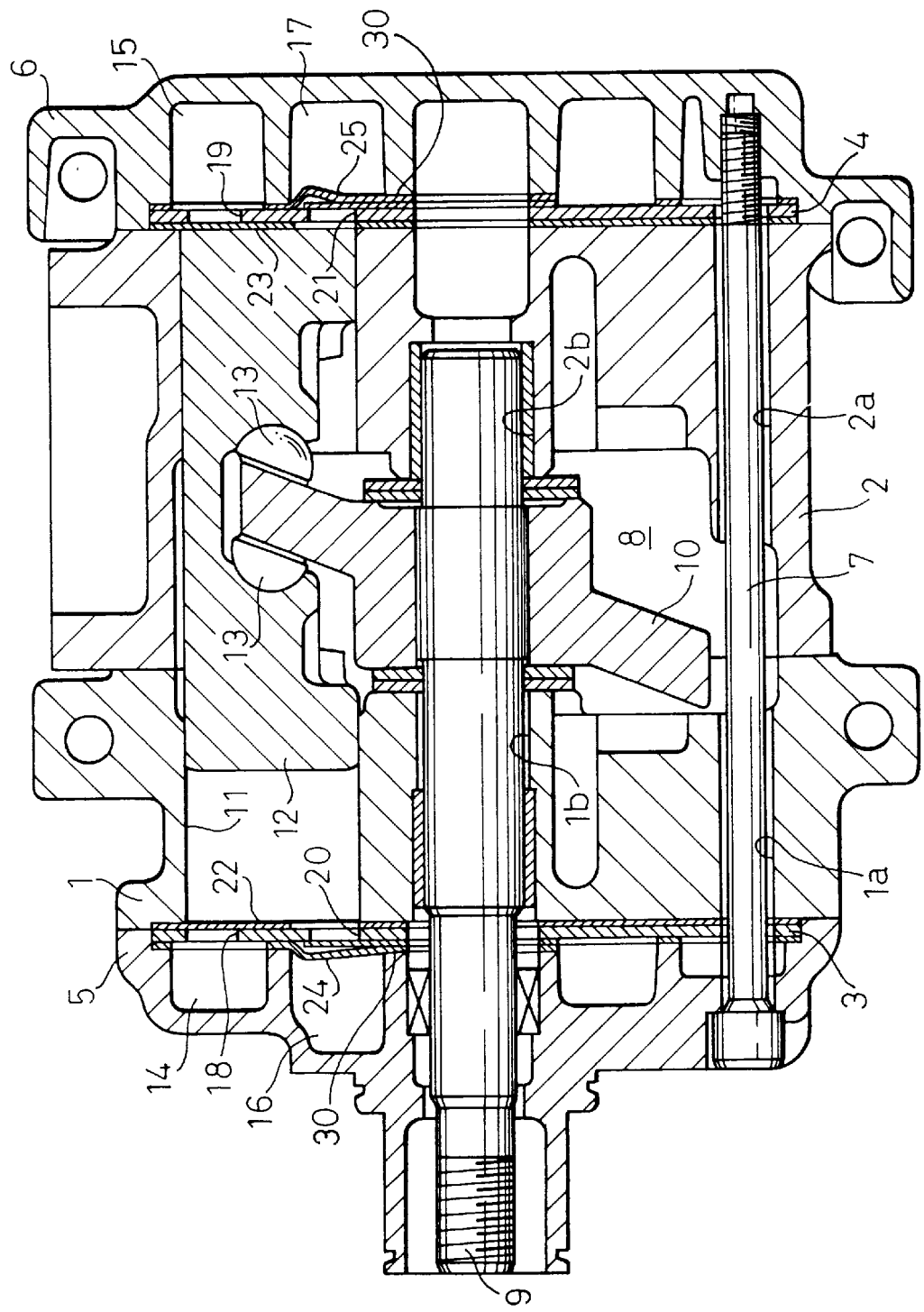
FIG. 1 is a longitudinal cross-sectional view of a refrigerant compressor, i.e., a swash plate type double-headed piston refrigerant compressor, in which gaskets according to the present invention are incorporated.

FIG. 1 illustrates a swash plate type refrigerant compressor of the type in which a gasket formed integrally with a valve retainer is incorporated. The swash plate type refrigerant compressor is provided with axially combined front and rear cylinder blocks 1 and 2 to form a primary part of the body of the compressor. The front and rear ends of the combined cylinder blocks 1 and 2 are closed by front and rear housings 5 and 6, via front and rear valve plates 3 and 4. The combined cylinder blocks 1 and 2, the valve plates 3 and 4, and the front and rear housings 5 and 6 are axially connected by a plurality of long screw bolts 7 which are inserted in through-bores 1a and 2a bored through the combined cylinder blocks 1 and 2. The combined cylinder blocks 1 and 2 are provided with a swash plate chamber 8 centrally formed in a connecting portion thereof. The swash plate chamber 8 receives therein a swash plate 10 which is fixedly mounted on a drive shaft 9 arranged to extend through central bores 1b and 2b of the combined cylinder blocks 1 and 2. The swash plate 10 rotates in the swash plate chamber 8 when the drive shaft 9 rotates.

The combined cylinder blocks 1 and 2 are provided with five axially extended cylinder bores 11 arranged around and in parallel with the drive shaft 9. Radial distances from an axis of rotation of the drive shaft 9 to respective central axes of the five cylinder bores 11 are made equal. Five double-headed pistons 12 are slidably fitted in the five cylinder bores 11 to reciprocate therein and, each of the five double-headed pistons 12 is operatively engaged with the swash plate 10 via a pair of semi-spherical shoes 13.

The front and rear housings 5 and 6 are provided with front and rear suction chambers 14 and 15 formed therein in a radially outer region thereof and front and rear discharge chambers 16 and 17 formed therein in a radially inner region thereof. The front and rear valve plates 3 and 4 are provided with front and rear suction bores 18 and 19 formed therein through which a refrigerant gas flows before compression from the front and rear suction chambers 14 and 15 into respective cylinder bores 11, and front and rear discharge bores 20 and 21 formed therein for discharging the refrigerant gas after compression from the respective cylinder bores 11 toward the front and rear discharge chambers 16 and 17.

Suction valves 22 and 23 are interposed between the opposite ends of the combined cylinder blocks 1 and 2 and the front and rear valve plates 3 and 4, and discharge valves 24 and 25 together with gaskets 30 formed to be integral with valve retainers are interposed between the valve plates 3 and 4 and the front and rear housings 5 and 6. The gasket 30 is formed so as to be improved over the gasket 50 of the prior art shown in FIGS. 6 and 7.

The description of the gasket 30 arranged on the front and rear sides of the combined cylinder blocks 1 and 2 are provided hereinbelow with reference to FIGS. 2 and 3. It should be understood that the gasket 30 is made of materials identical with those of the gasket 50. Namely, the gasket 30 is basically made of a metallic plate material and coated with an elastic material such as a rubber material. Further, the gasket 30 is produced by employing dies and a press machine to be formed in a basically round element similar to the gasket 50 of the prior art, and is also formed to be integral with valve retainers similar to the retainers 53 of the gasket 50.

Figure 2:
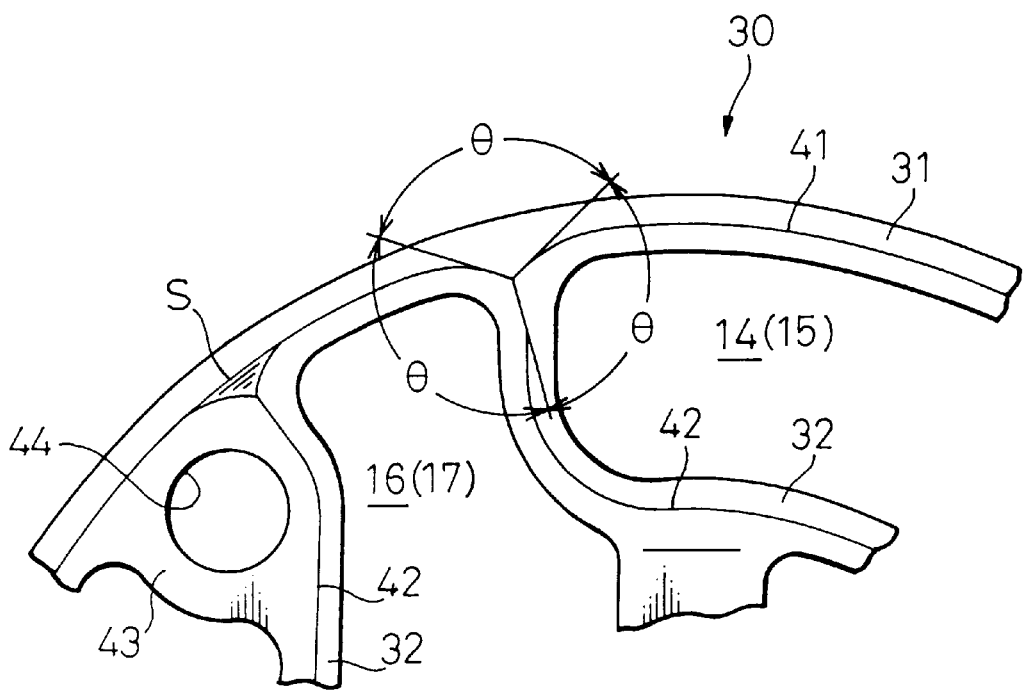
FIG. 2 is a partial enlarged view of a gasket according to an embodiment of the present invention.

FIG. 2 illustrates, in an enlarged scale, a characterized portion of the gasket 30 according to a first embodiment of the present invention. Referring to FIG. 2, the gasket 30 is provided with an outer sealing portion 31 adapted to sealing an outer circumference of the refrigerant compressor when it is incorporated in the compressor, i.e., when it is incorporated between the front or rear housings 5 or 6 and the front or rear valve plate 3 or 4. Thus, the outer sealing portion 31 is formed in a cylindrically extending strip having a radial width necessary for sealing the outer circumference of the refrigerant compressor.

The gasket 30 is also provided with an inner sealing portion 32 adapted for sealing between a high pressure region such as the discharge chamber 16 or 17 defined in the front or rear housing 5 or 6 and a low pressure region such as the suction chamber 14 or 15. Thus, the inner sealing portion 32 is arranged radially inside the outer sealing portion 31 and is formed in an annularly extending strip suitable for sealing between the high and low pressure regions. The inner sealing portion 32 has sections connected to the outer sealing portion 31. One of the connected sections of the inner sealing portion 32 extends radially so as to be trifurcatedly connected to a predetermined position of the outer sealing portion 31, and the other of the connected sections of the inner sealing portion 32 extends so as to be trifurcatedly connected to a different predetermined position of the outer sealing portions 31 while passing by one of lug portions 43 in which a through-bore 44 for the insertion of the screw bolt 7 is formed.

The outer and inner sealing portions 31 and 32 are provided with continuous and deformable ridges 41 and 42, respectively. Each of the ridges 41 and 42 is formed as a curved projection having an apex line thereof as shown by solid lines in FIG. 2. A cross-sectional form of each of the ridges 41 and 42 is similar to that of the ridge 61 or 62 shown in FIG. 5. Nevertheless, the ridges 41 and 42 of the gasket 30 are connected to one another at the trifurcatedly connecting position of the outer and inner sealing portions 31 and 32 in a manner completely different from the connecting manner of the prior art gasket 50.

Figure 6:
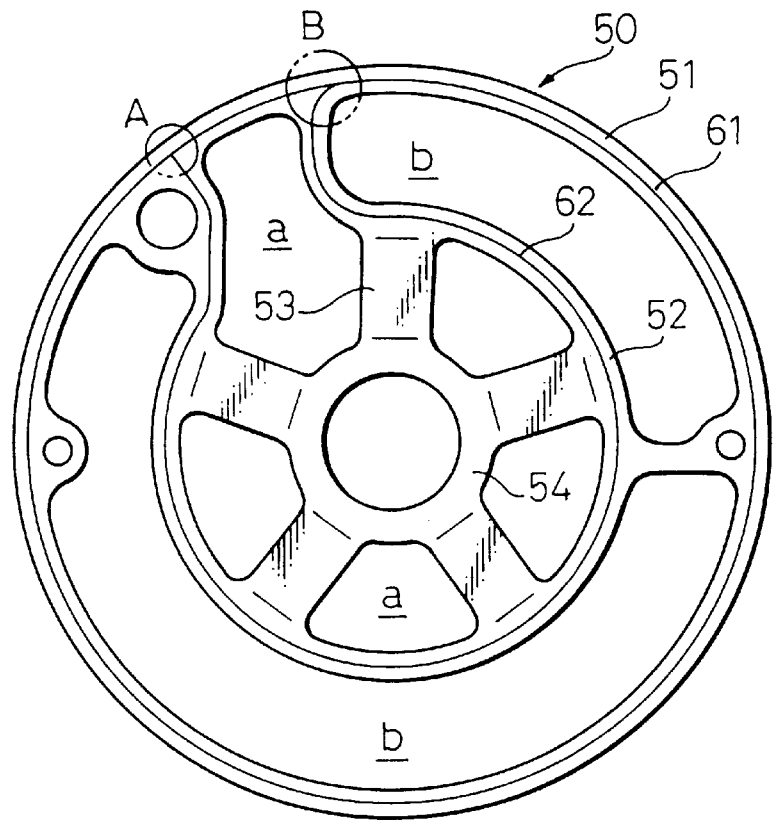
FIG. 6 is a plan view of a gasket according to the prior art.
Figure 7:
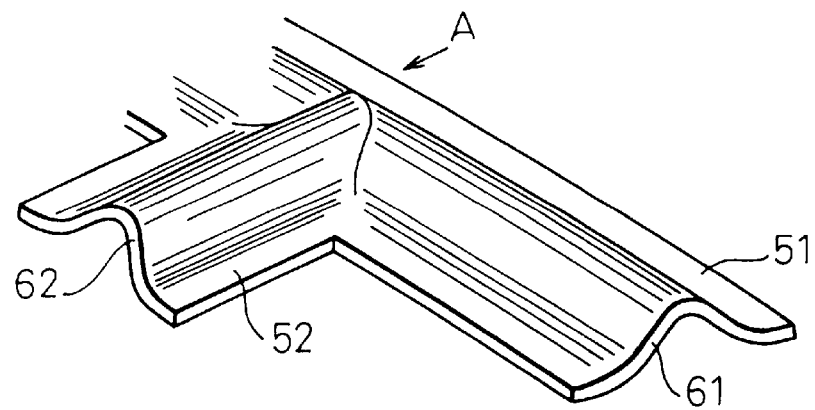
FIG. 7 is a partial perspective view of the gasket of the prior art, illustrating a detailed construction of a portion "A" in FIG. 6.

In the embodiment of the gasket 30 of FIG. 2, the two trifurcated connecting portions of the outer and inner sealing portions 31 and 32 corresponding to the portions "A" and "B" of FIG. 6 are different from each other. Namely, in the trifurcated connecting position of the outer and inner sealing portions 31 and 32 corresponding to the portion "B" of FIG. 6, the apex lines of the trifurcatedly connected ridges 41, 41 and 42 are arranged to have three separate angles between three neighboring apex lines, which are made substantially equal. Thus, respective angles are indicated by the same symbol "θ" in FIG. 2.

Figure 4:
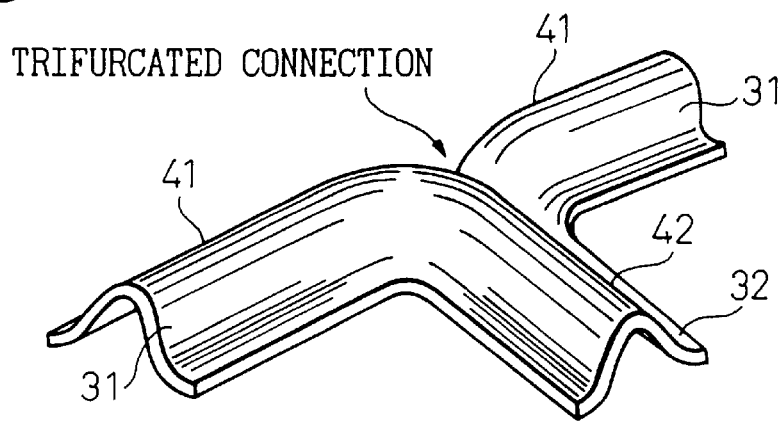
FIG. 4 is a partial perspective view of the gasket of FIG. 2, illustrating a trifurcated connection of the ridges of the gasket.

In accordance with the above-described equi-angular connection of the ridges 41, 41 and 42 of the outer and inner sealing portions 31 and 32, the connected three ridges 41, 41 and 42 are arranged to be geometrically balanced to form a balanced trifurcated connection as clearly shown in FIG. 4. Thus, the three connected ridges exhibit a substantially equal mechanical rigidity. Therefore, when the gasket 30 is held between the valve plate 3 or 4 and the front of rear housing 5 or 6 under compression, the three interconnected ridges 41, 41, and 42 are elastically deformed in a uniform and stable manner and are capable of exhibiting a good sealing function.

Figure 5A:
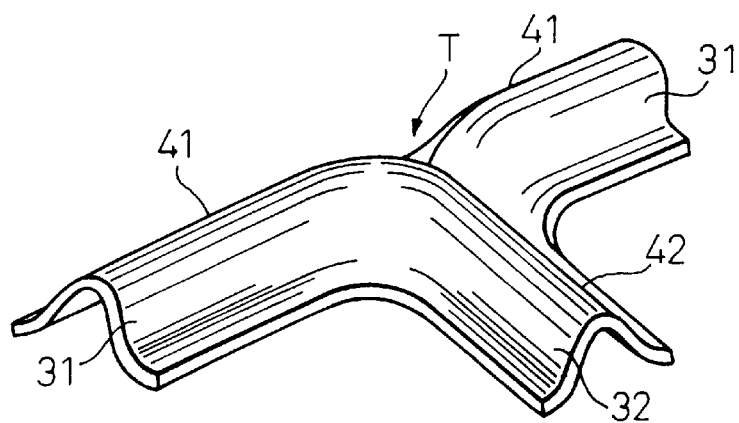
FIG. 5A is a partial perspective view of the gasket of FIG. 3, illustrating an extended smoothly curved face "T" of the trifurcatedly connected ridges of the gasket.
Figure 5B:
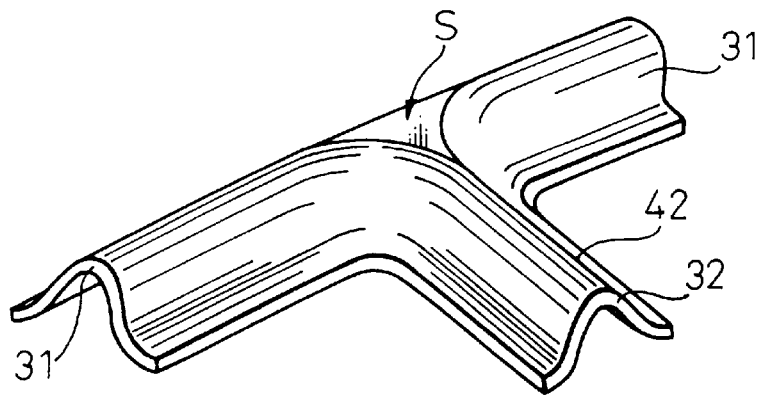
FIG. 5B is a partial perspective view of the gasket of FIGS. 2 and 3, illustrating an extended flat face "S" of the trifurcatedly connected ridges of the gasket.

On the other hand, in the trifurcated connecting position of the outer and inner sealing portions 31 and 32 corresponding to the portion "A" of FIG. 6, the ridges 41, 41, and 42 are connected to one another, so that the apex lines of the three ridges 41, 41, and 42 lie in an extended area which is formed as a substantially triangular-shape smooth flat face designated by "S". Namely, as best shown in FIG. 5B, the triangular-shape flat face is enclosed by three sides formed by the three apex lines of the three ridges 41, 41, and 42. Therefore, when the gasket 30 is sandwiched between either the front housing 5 and the front valve plate 3 or the rear valve plate 4 and the rear housing 6 under compression, the above-mentioned triangular flat face "S" is in face contact with a corresponding sealed portion of the front or rear housing 5 and 6. Therefore, during the elastic deformation of the connected portion of the ridges 41, 41 and 42, an unbalanced condition in the mechanical rigidity of these ridges is removed by the extended smooth flat face "S" of the gasket 30. As a result, the triangular-shape smooth flat face "S" of the gasket 30 can exhibit a good and stable sealing function.

Further, due to the existence of the extended smooth flat face "S" in which a part of the apex lines of the ridges 41 and 42 of the gasket 30 disappear, when the gasket 30 is produced by employing a die and a press machine, a part of an internal shape of the die can be simplified to eliminate any complicated grooves corresponding to the interconnected apex lines of the ridges 41 and 42. Thus, during the mass production of the gaskets 30, abrasion of the die can be appreciably reduced so that the productivity of the gasket 30 can be increased.

Figure 3:
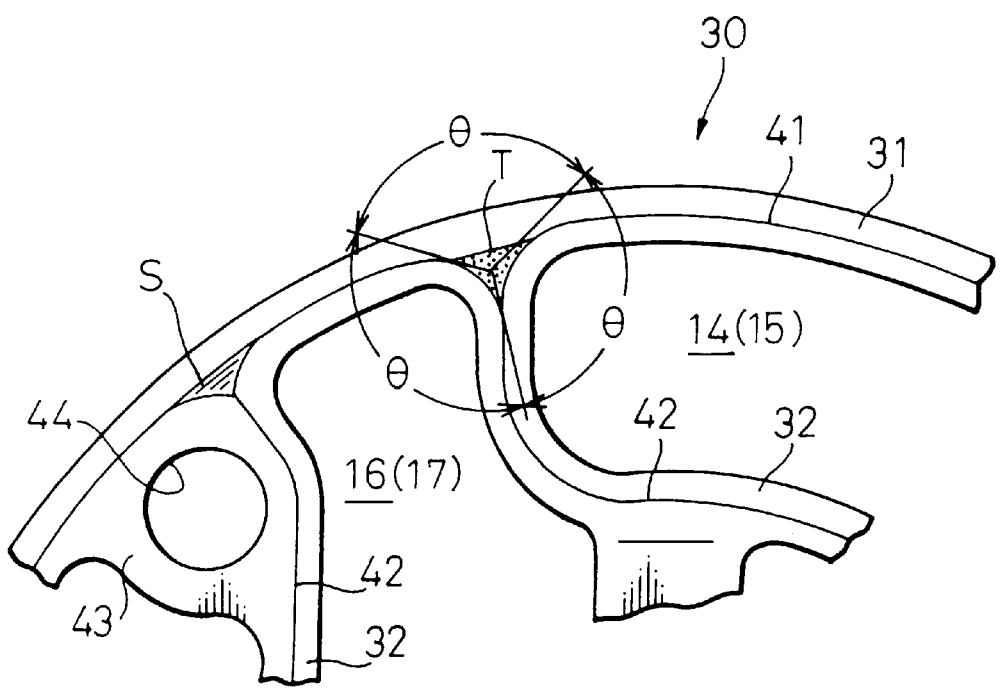
FIG. 3 a partial enlarged view of a gasket according to another embodiment of the present invention.

FIG. 3 illustrates the gasket 30 according to another embodiment of the present invention. In the embodiment of FIG. 3, the structure of the trifurcated connecting position of the outer and inner sealing portions 31 and 32 corresponding to the portion "B" of FIG. 6 is different from that of the previous embodiment of FIG. 2. In the embodiment of FIG. 3, the interconnected portion of the three ridges 41, 41 and 42 is geometrically arranged to define three separate but substantially equal angles "θ" between the respective neighboring apex lines of the three ridges 41, 41 and 42. Further, an extended smoothly curved face "T" containing therein the three apex lines of the interconnected portion of the three ridges 41, 41 and 42 is formed. As shown in FIG. 5A, the extended smoothly curved face "T" is formed as a convex face curving in the same direction as the respective ridges and having a radius of curvature larger than that of the respective ridges 41 and 42. Thus, for example, when the gasket 30 is held between the front valve plate 3 and the front housing 5 under compression, the extended smoothly curved face "T" of the connected portion of the outer and inner sealing portions 31 and 32 is elastically deformed, so that not only deformations of the three respective ridges 41, 41 and 42 at the connected portion thereof are mutually balanced but also the gasket 30 and the sealed portion of the refrigerant compressor are maintained in face contact with one another. Therefore, a stable and better sealing function of the gasket 30 can be obtained. Further, the productivity of the gaskets 30 of the embodiment of FIG. 3 can be very high compared with that of the gasket of the prior art shown in FIGS. 6 and 7, due to the same reason as set forth above with reference to the previous embodiment of FIG. 2. In the embodiment of FIG. 3, the interconnected portion of the ridges of the outer and inner sealing portions 31 and 32 which corresponds to the connected potion "A" of the gasket 50 of FIG. 6, an extended flat face "S" containing therein the apex lines of the ridges 41, 41 and 42 is formed. The construction of the extended flat face "S" is clearly shown in FIG. 5B. It should be understood that the extended smooth flat face "S" and the extended smoothly curved face "T" of the gasket 30 according to the embodiment of FIG. 3 may be replaced with one another as required.

From the foregoing description of the preferred embodiments of the present invention, it will be understood that, in accordance with the present invention, since the gasket for a refrigerant compressor is formed integrally with a valve retainer element and has a circular outer and an annular inner sealing portions which are provided with deformable ridges trifurcatedly connected with one another at at least one portion thereof and geometrically arranged to exhibit balanced mechanical rigidity, the gasket can provide fluid-tight, stable and good sealing for an outer circumference of the refrigerant compressor as well as a boundary portion between high and low pressure regions within the refrigerant compressor. The trifurcatedly interconnected portion of the ridges of the outer and inner sealing portions of the gasket may be formed in an extended smooth flat or curved face containing therein apexes of the ridges of the outer and inner sealing portions, so that the gasket can be in face contact with sealed portions of the compressor. Thus, the trifurcatedly connected portion of the ridges of the outer and inner sealing portions of the gasket according to the present invention can exhibit a good sealing function with a high stability.

What is claimed is:

1. A gasket having a surface thereof coated with an elastic membrane and adapted to being interposed, together with a valve plate and a discharge valve, between a cylinder block and a housing of a refrigerant compressor under compression, comprising:

an outer sealing portion for sealing an outer circumference of the compressor against an atmospheric environment therearound;

an inner sealing portion for sealing between a high pressure region and a low pressure region within the compressor, said inner sealing portion being provided with at least one predetermined section thereof trifurcatedly connected to said outer sealing portion; and a deformable ridge portion formed in each of said outer and inner sealing portions including said at least one predetermined section to have the shape of a curved projection with a continuously extending apex line, said deformable ridge portion of said predetermined section of said inner sealing portion being connected to said deformable ridge portion of said outer sealing portion to form a trifurcated connection in which three separate angles "θ" formed between three neighboring apex lines of said trifurcatedly connected deformable ridge portions made substantially equal to one another.

2. The gasket according to claim 1, wherein said extended and smooth face of said trifurcated connection of said outer and inner sealing portions is formed in an extended flat face in which said apex lines of said connected ridge portions of said outer and inner sealing portions lie.

3. The gasket according to claim 2, wherein said extended flat face is a substantially triangular shape flat face enclosed by three sides formed by said apex lines of said connected ridge portions.

4. The gasket according to claim 1, wherein said extended and smooth face of said trifurcated connection of said outer and inner sealing portions is formed in an extended and smooth curved face in which said apex lines of said connected ridge portions of said outer and inner sealing portions lie.

5. A gasket having a surface thereof coated with an elastic membrane and adapted to being interposed, together with a valve plate and a discharge valve, between a cylinder block and a housing of a refrigerant compressor under compression, comprising:

an outer sealing portion for sealing an outer circumference of the compressor against an atmospheric environment therearound;

an inner sealing portion for sealing between a high pressure region and a low pressure region within the compressor, said inner sealing portion being provided with at least one predetermined section thereof trifurcatedly connected to said outer sealing portion; and a deformable ridge portion formed in each of said outer and inner sealing portions including said at least one predetermined section to have the shape of a curved projection with a continuously extending apex line, said deformable ridge portion of said predetermined section of said inner sealing portion being connected to said deformable ridge portion of said outer sealing portion to form a trifurcated connection in which three separate angles "$\theta$" formed between three neighboring apex lines of said connected deformable ridge portions are made substantially equal to one another, and an extended and smooth face is provided to contain therein said apex lines of said trifurcatedly connected ridge portions of said outer and inner sealing portions.

* * * * *

UNITED STATES PATENT AND TRADEMARK OFFICE
CERTIFICATE OF CORRECTION

PATENT NO. : 6,068,265

DATED : May 30, 2000

INVENTORS : Hayato IKEDA, Noriyuki SHINTOKU, Keishi NAKAGAKI, Tomohiro WAKITA

It is certified that an error appears in the above-identified patent and that said Letters Patent is hereby as shown below:

Claims 2 and 4, lines 1 and 2: please delete "said extended and smooth face of";

Line 3: "formed in" should read --provided with--.

Signed and Sealed this

Twenty-fourth Day of April, 2001

*Attest:*

NICHOLAS P. GODICI

*Attesting Officer*     *Acting Director of the United States Patent and Trademark Office*